(12) United States Patent
Furuta (10) Patent No.: US 8,573,428 B2
(45) Date of Patent: Nov. 5, 2013

(54) ARTICLE STORAGE CASE

(76) Inventor: Yoshihisa Furuta, Hamamatsu (JP)

( * ) Notice: Subject to any disclaimer, the term of this patent is extended or adjusted under 35 U.S.C. 154(b) by 0 days.

(21) Appl. No.: 13/696,608

(22) PCT Filed: May 6, 2011

(86) PCT No.: PCT/JP2011/061010
§ 371 (c)(1),
(2), (4) Date: Nov. 7, 2012

(87) PCT Pub. No.: WO2011/142444
PCT Pub. Date: Nov. 17, 2011

(65) Prior Publication Data
US 2013/0056462 A1 Mar. 7, 2013

(30) Foreign Application Priority Data
May 10, 2010 (JP) .................. 2010-108685

(51) Int. Cl.
*A47G 19/00* (2006.01)
*B65D 21/02* (2006.01)
(52) U.S. Cl.
USPC ...... 220/23.2; 220/23.4; 220/23.8; 220/23.83
(58) Field of Classification Search
USPC ............... 220/23.2, 23.4, 23.8, 23.6, 23.83;
403/264, 255, 252; 248/220.21,
248/221.11, 223.41, 224.8, 223.21, 225.21,
248/221.12, 220
See application file for complete search history.

(56) References Cited

U.S. PATENT DOCUMENTS

| | | | | |
|---|---|---|---|---|
| 1,477,542 A | * | 12/1923 | Comlossy ................ | 410/155 |
| 3,194,426 A | * | 7/1965 | Brown, Jr. ................ | 220/23.4 |
| 3,763,980 A | * | 10/1973 | Vom Stein et al. ........ | 193/35 R |
| 4,202,643 A | * | 5/1980 | Backteman ................ | 403/33 |
| 4,410,095 A | * | 10/1983 | Dembicks ................ | 211/70.6 |
| 4,770,297 A | * | 9/1988 | Chang ..................... | 206/379 |
| 4,889,254 A | * | 12/1989 | Vola ....................... | 220/23.4 |

(Continued)

FOREIGN PATENT DOCUMENTS

| JP | 60-21432 U | 2/1985 |
|---|---|---|
| JP | 01-73187 U | 5/1989 |

(Continued)

OTHER PUBLICATIONS

The International Search Report of the International Searching Authority mailed Aug. 9, 2011 for the corresponding international application No. PCT/JP2011/061010 (with English translation).

*Primary Examiner* — Anthony Stashick
*Assistant Examiner* — Don M Anderson
(74) *Attorney, Agent, or Firm* — Posz Law Group, PLC (57) ABSTRACT

An article storage case is capable of highly reliable coupling to another such article storage case by simply placing the cases side by side. An article storage case according to the invention is in a substantially cubic or rectangular parallelepiped form having an opening oriented upwardly and has an arrangement in which a sidewall thereof has an outside surface formed with an engagement projection and an engagement recess, and in which when a plurality of such article storage cases are placed side by side, the engagement projection of one of adjacent article storage cases is capable of being movably fitted into the engagement recess of another one of the adjacent article storage cases to couple the adjacent storage cases to each other by engagement between the engagement projection and the engagement recess which are movably fitted with each other.

8 Claims, 7 Drawing Sheets

(56) References Cited

U.S. PATENT DOCUMENTS

| | | | |
|---|---|---|---|
| 5,050,755 A * | 9/1991 | Strawder | 220/23.4 |
| 5,310,071 A * | 5/1994 | Rivlin et al. | 220/23.4 |
| 6,276,550 B1 * | 8/2001 | Cherrington | 220/23.4 |
| 6,550,794 B1 * | 4/2003 | Spindel et al. | 280/79.11 |
| 7,516,860 B1 * | 4/2009 | Fenton et al. | 215/6 |
| 2006/0243627 A1 | 11/2006 | Meissen | |
| 2008/0217340 A1 | 9/2008 | Jager | |

FOREIGN PATENT DOCUMENTS

| | | |
|---|---|---|
| JP | 07-052950 A | 2/1995 |
| JP | 08-282757 A | 10/1996 |
| JP | 09-169339 A | 6/1997 |
| JP | 2005-138883 A | 6/2005 |
| JP | 2005-306500 A | 11/2005 |
| JP | 3152770 U | 7/2009 |

* cited by examiner

ARTICLE STORAGE CASE

CROSS REFERENCE TO RELATED APPLICATIONS

This application is a U.S. national stage application of PCT/JP2011/061010 filed on May 6, 2011, and claims priority to, and incorporates by reference, Japanese Patent Application No. 2010-108685 filed on May 10, 2010.

TECHNICAL FIELD

The present invention relates to an article storage case. More specifically, the present invention relates to an article storage case which is capable of being coupled to another such article storage case placed side by side therewith.

BACKGROUND ART

An article storage case molded of a plastic or a like material is adopted for storage, safekeeping and transportation of parts in a factory or the like.

Among such article storage cases, one known article storage case is of the type provided with coupling means configured to couple such cases to each other in order to prevent fall or collapse of a load of such cases placed side by side on a pallet or a like inconvenience in transportation by a forklift.

An article storage case (plastic container) disclosed in Japanese Patent Application Laid-open No. H7-52950 (hereinafter will be referred to as "Patent Document 1") for example has a side surface fitted with a permanent magnet which serves as coupling means for coupling adjacent cases to each other by the magnetic force of the magnet.

An article storage case (container) disclosed in Japanese Patent Application Laid-open No. H9-169339 (hereinafter will be referred to as "Patent Document 2") has an opening edge portion in an upper portion thereof which is fitted with a pivotable coupling member of steel configured to engage the upper edge and/or the coupling member of a counterpart case placed adjacent thereto by pivoting.

Any one of the cases described in Patent Documents 1 and 2 noted above, however, has to be fitted on its case body with the permanent magnet or coupling member as a separate part. Such a separate part incurs an increase in cost by the price thereof. In recycling the case, the permanent magnet or coupling member thus fitted has to be removed, which is inconvenient.

Though the case described in Patent Document 1 utilizes the magnetic force of the permanent magnet to allow a stable stack of such cases to be formed with less possibility of falling or collapsing by simply placing the cases side by side, the coupling force between adjacent cases is weak and, hence, the coupling therebetween is poor in reliability. In addition, since only the magnetic coupling force between adjacent cases is utilized, a forklift or the like cannot transport the cases thus coupled without using a pallet.

On the other hand, the technique disclosed in Patent Document 2 enables highly reliable coupling to be made between cases by means of the coupling member of steel. However, a troublesome coupling operation using the coupling member is indispensable.

DISCLOSURE OF THE INVENTION

The present invention has been made with the above-described problems of the background art in view. An object of the present invention is to provide an article storage case which is capable of highly reliable coupling to another such article storage case by simply placing the cases side by side.

In order to solve the foregoing problems, the present invention provides an article storage case having the following arrangements [1] to [5].

[1] An article storage case in a substantially cubic or rectangular-parallelepiped form having an opening oriented upwardly, characterized in that: a sidewall thereof has an outside surface formed with an engagement projection and an engagement recess; and when a plurality of such article storage cases are placed side by side, the engagement projection of one of adjacent article storage cases is capable of being movably fitted into the engagement recess of another one of the article storage cases to couple the adjacent storage cases to each other by engagement between the engagement projection and the engagement recess which are movably fitted with each other.

[2] The article storage case according to the arrangement [1], wherein the engagement projection is substantially T-shaped having a bulged tip, while the engagement recess is substantially C-shaped to have an opening which is narrower than an inside space of the engagement recess.

[3] The article storage case according to the arrangement [1] or [2], wherein the engagement projection is a projecting ridge extending horizontally on the outside surface of the sidewall, while the engagement recess is an elongated recess extending horizontally on the outside surface of the sidewall.

[4] The article storage case according to any one of the arrangements [1] to [3], wherein the engagement projection is formed on one of a right-hand side and a left-hand side of the outside surface of the sidewall, while the engagement recess is formed on the other one of the right-hand side and the left-hand side of the outside surface of the sidewall and on a same horizontal plane as the engagement projection.

[5] The article storage case according to any one of the arrangements [1] to [4], wherein all of four sidewalls thereof have respective outside surfaces each formed with the engagement projection and the engagement recess.

With the article storage case according to the present invention, it is possible to reduce the manufacturing cost and facilitate the recycling because the engagement projection and the engagement recess are simply molded integrally with the outside surface of a sidewall of the case without the need to add any special part separately for coupling cases to each other.

With the article storage case according to the present invention, it is also possible to couple adjacent article storage cases to each other by movably fitting the engagement projection formed on the outside surface of the sidewall of one of the adjacent article storage cases into the engagement recess formed on the outside surface of the sidewall of the other article storage case and bringing the engagement projection and the engagement recess into engagement with each other. For this reason, the coupling operation is an operation of simply placing the article storage cases side by side. Further, the coupling made by engagement between the engagement projection and the engagement recess is highly reliable unlike the coupling relying upon the magnetic force.

BEST MODE FOR CARRYING OUT THE INVENTION

Hereinafter, an embodiment of an article storage case according to the present invention will be described in detail with reference to the drawings.

Figure 1:
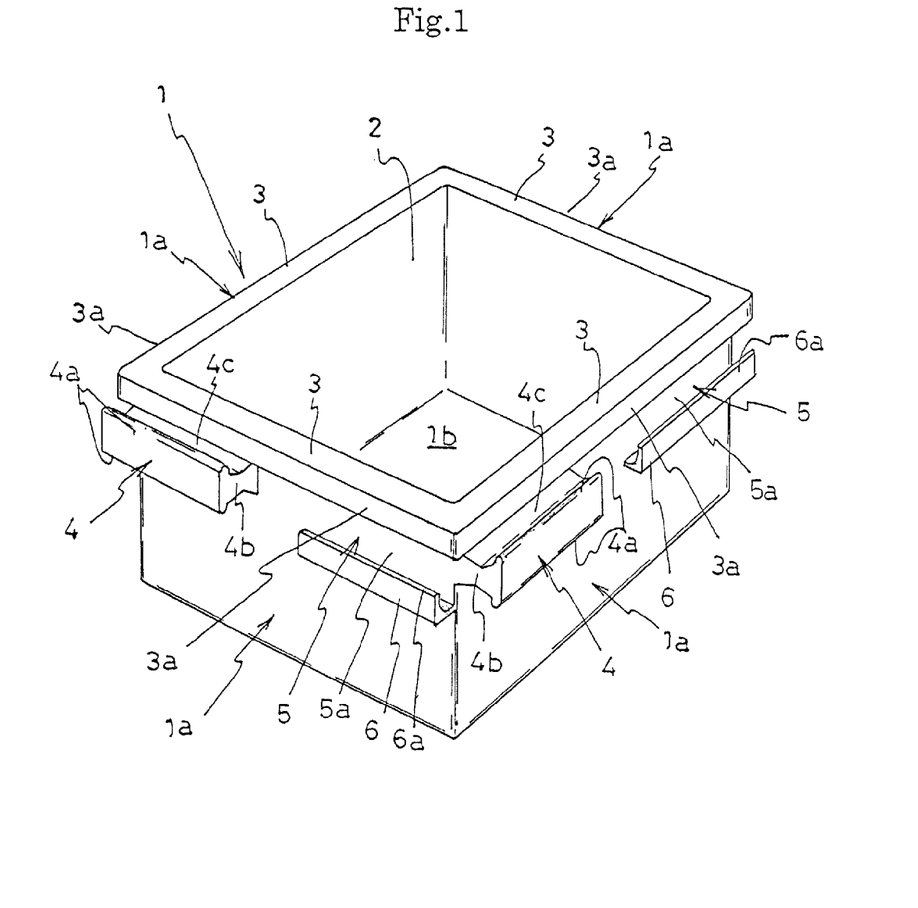
FIG. 1 is a perspective view illustrating one embodiment of an article storage case according to the present invention.

An article storage case 1 shown according to the present invention is wholly integrally molded of a plastic for example and has a substantially rectangular parallelepiped form having an opening 2 oriented upwardly as shown in FIG. 1.

In the article storage case 1, the peripheral edges of the opening 2, i.e., the top edges of sidewalls 1a, have respective flanges 3 extending horizontally outwardly. Each of the flanges 3 is formed at its outer edge with a dangling piece 3a extending vertically downwardly.

The four sidewalls 1a of the article storage case 1 have their respective outside surfaces each formed an engagement projection 4 and an engagement recess 5.

Figure 2:
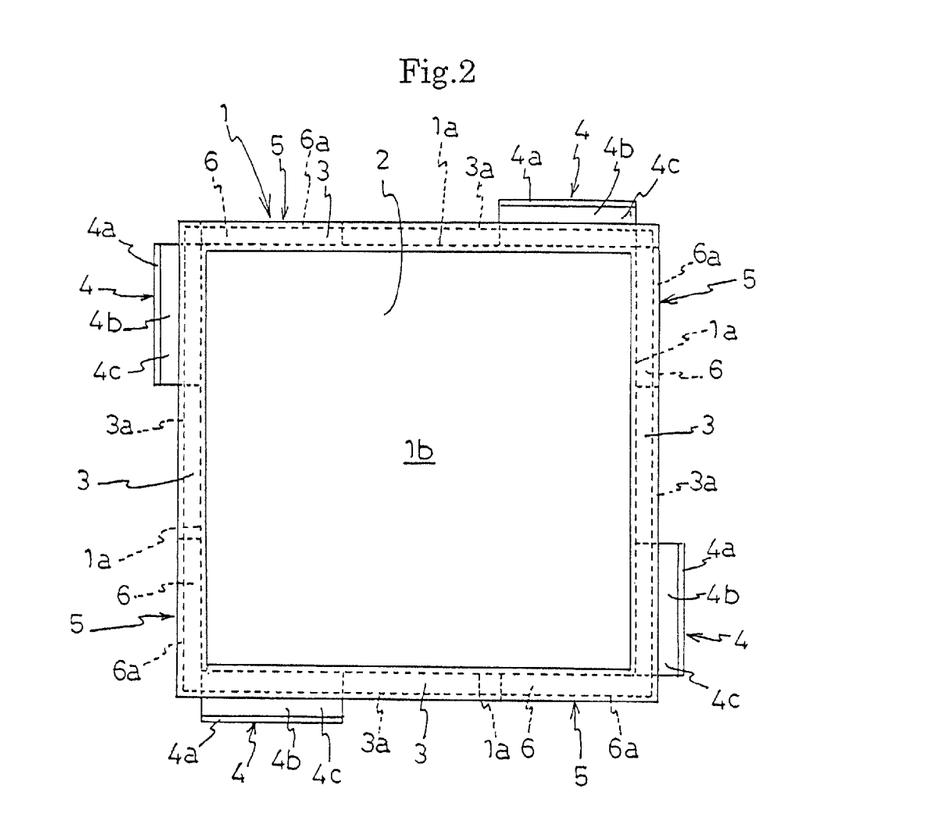
FIG. 2 is a plan view of the article storage case shown in FIG. 1.
Figure 3:
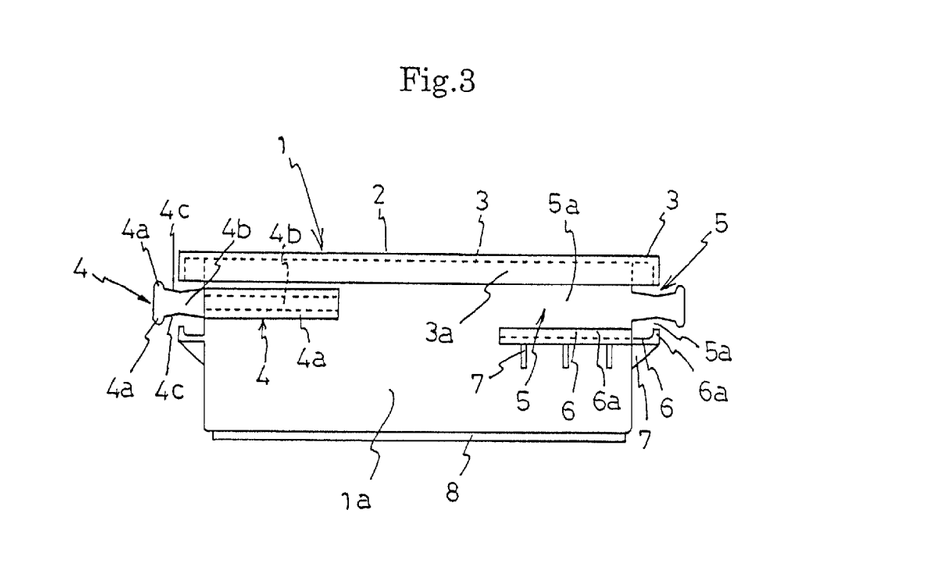
FIG. 3 is a front elevational view of the article storage case shown in FIG. 1.

The engagement projection 4 is substantially T-shaped having a tip which is bulged upwardly and downwardly. The substantially T-shaped engagement projection 4 is in the form of a projecting ridge horizontally extending on the left-hand side of the outside surface of each sidewall 1a. More specifically, the substantially T-shaped engagement projection 4 has engagement pieces 4a bulged upwardly and downwardly at the tip, a neck portion 4b having upper and lower surfaces formed into V-shaped slopes 4c, and a narrowed portion at an intermediate portion of the neck portion 4b, as shown in FIGS. 1 to 3.

Figure 7:
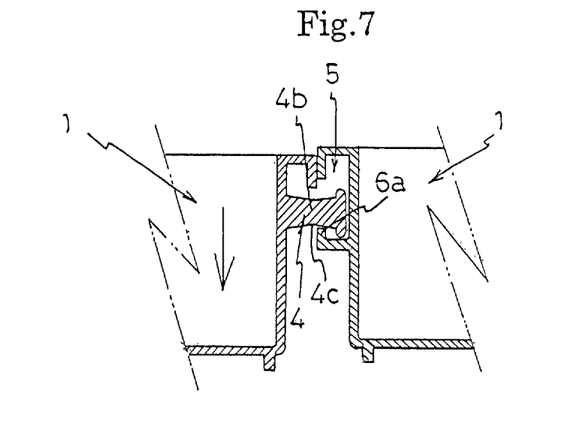
FIG. 7 is a sectional view illustrating a state in which the two adjacent article storage cases are coupled to each other by engagement between the engagement projection and the engagement recess which are movably fitted with each other.

The engagement recess 5, on the other hand, comprises the flange 3 which is formed on the top edge of each sidewall 1a and has the dangling piece 3a, and a protruding piece 6 forming part of the engagement recess which is formed on the outside surface of the sidewall 1a so as to be opposed to the flange 3. The protruding piece 6 forming part of the engagement recess has an outer edge formed with a locking piece 6a projecting vertically upwardly. The protruding piece 6 having the locking piece 6a and the flange 3 having the dangling piece 3a define the substantially C-shaped engagement recess 5 having an opening 5a which is narrower than the inside space of the recess 5. In FIG. 7, reference numeral 7 denotes a rib for reinforcing the protruding piece 6 forming part of the engagement recess.

The engagement recess 5 is in the form of an elongated recess extending horizontally on the outside surface of each sidewall 1a. The engagement recess 5 is formed on the right-hand side of the outside surface of each sidewall 1a and on the same plane as the engagement projection 4.

The article storage case 1 has a bottom wall 1b having a reverse side formed with a leg portion 8 shaped to fit into the opening 2 in an upper portion thereof.

In a factory or the like, the article storage case 1 thus constructed according to the present invention may be placed beside an operator to store articles therein, and such article storage cases 1 may be stacked on a one-case carriage or the like.

Figure 4:
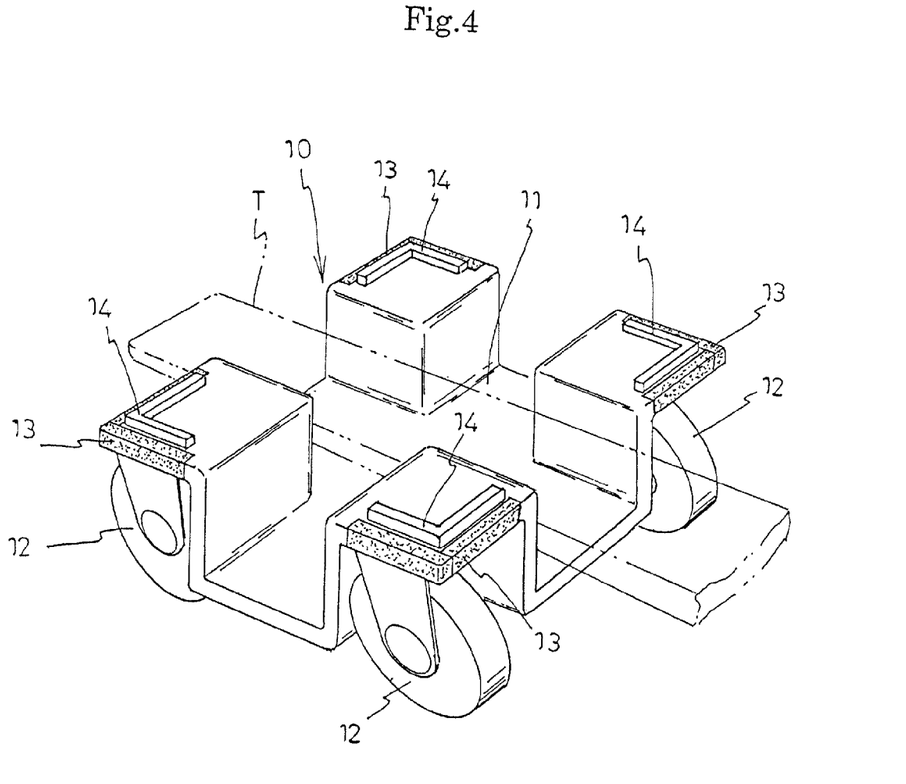
FIG. 4 is a perspective view illustrating one embodiment of a carriage for transporting an article storage case according to the present invention.

A one-case carriage 10 having a structure shown in FIG. 4 for example is preferably used.

The carriage 10 has a cross-shaped dent portion 11 which allows a fork T of a forklift to be inserted therein, and casters 12 mounted at the four corners thereof. The angular portions at the four corners have respective permanent magnets 13 embedded therein and respective stoppers 14 formed on top surfaces thereof for preventing the case loaded thereon from being displaced.

Figure 5:
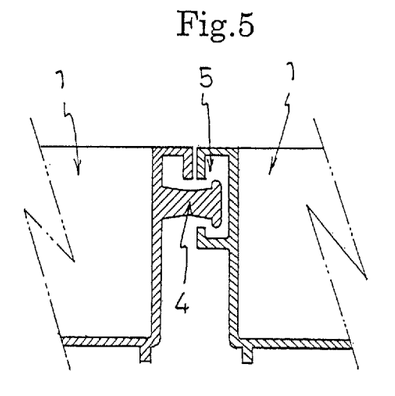
FIG. 5 is a sectional view illustrating a state in which an engagement projection of one of two adjacent article storage cases according to the present invention is movably fitted in an engagement recess of the other article storage case according to the present invention.
Figure 8:
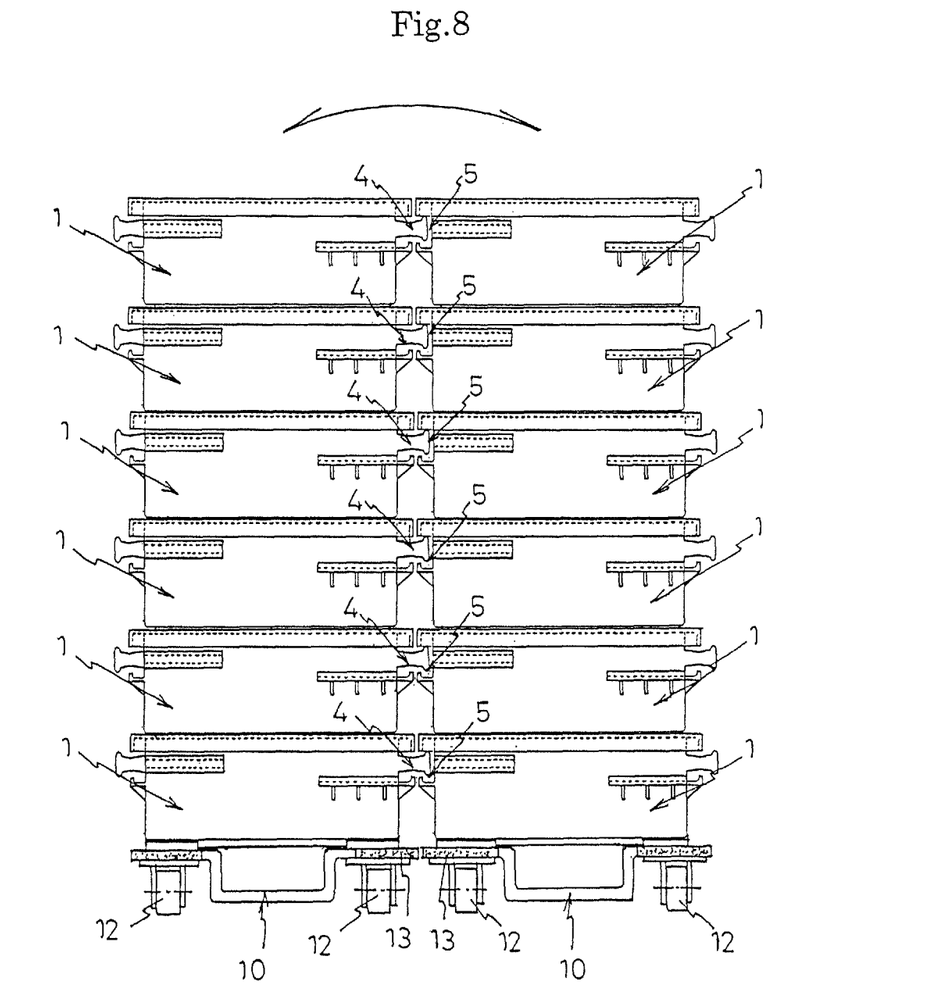
FIG. 8 is a front elevational view illustrating a state in which a plurality of article storage cases according to the present invention are placed side by side.

A stack of article storage cases 1 loaded on the carriage 10 is placed side by side with a stack of article storage cases 1 loaded on another carriage 10, as shown in FIG. 8. At that time, the engagement projection 4 formed on each article storage case 1 is movably fitted into the engagement recess 5 formed on the article storage case 1 placed side by side therewith smoothly, as shown in FIG. 5. The presence of the permanent magnets 13 embedded in these carriages 10 makes it hard to separate the carriages 10 from each other.

Figure 6:
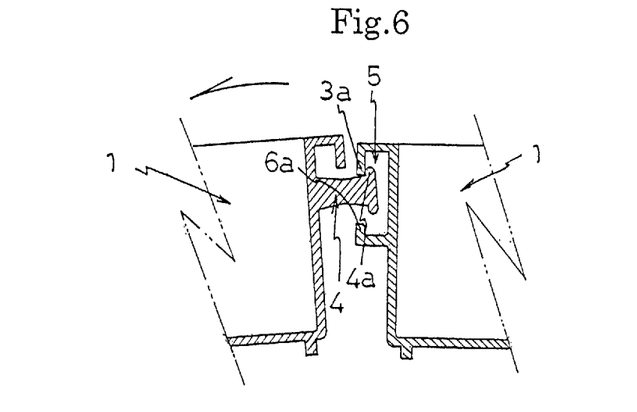
FIG. 6 is a sectional view illustrating a state in which the two adjacent article storage cases are coupled to each other by engagement between the engagement projection and the engagement recess which are movably fitted with each other.

Even when the stacks of article storage cases 1 are swayed sidewardly by the action of some force, each engagement projection 4 and the counterpart engagement recess 5 which are movably fitted with each other come to engage each other to prevent the load of article storage cases from falling or collapsing. Specifically, as shown in FIG. 6, the engagement piece 4a of the substantially T-shaped engagement projection 4 comes to abut against the dangling piece 3a (or locking piece 6a) of the substantially C-shaped engagement recess 5 to prevent the engagement projection 4 from coming off the engagement recess 5, thereby maintaining the coupled condition to prevent the load of article storage cases from falling or collapsing.

Figure 9:
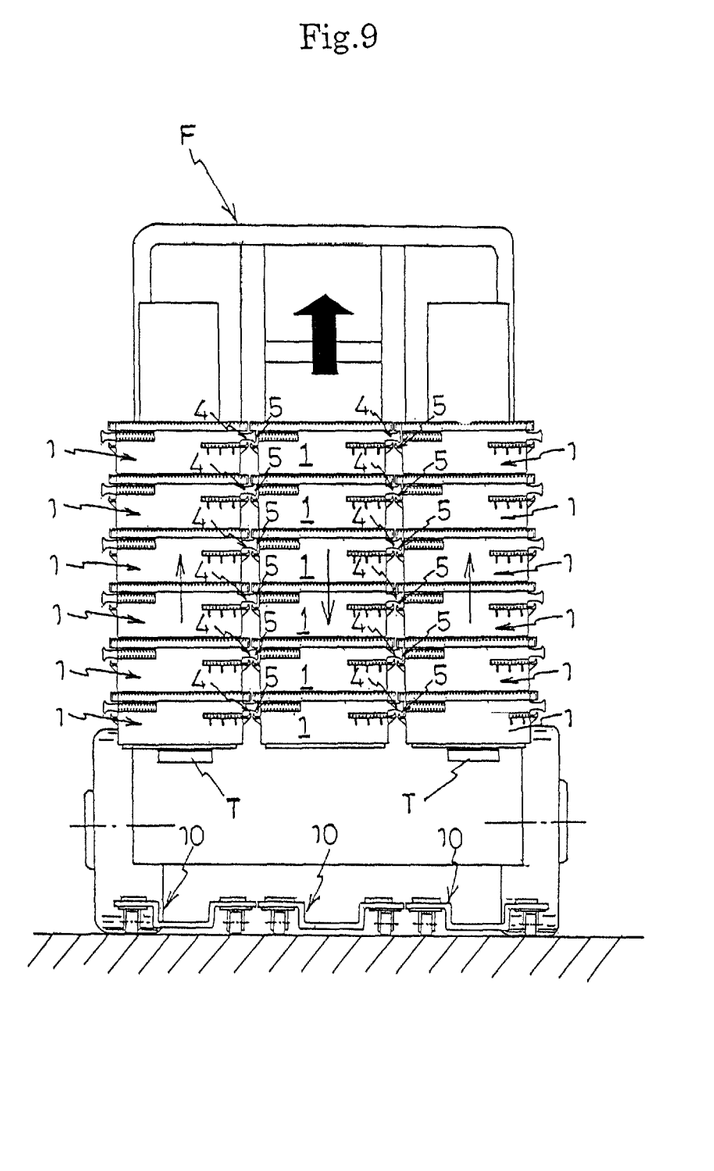
FIG. 9 is a front elevational view illustrating a state in which a plurality of article storage cases according to present invention are lifted up by a forklift without use of a pallet.

A forklift F can lift up and transport three columns of stacked article storage cases 1 without using a pallet by supporting the lower ends of the right-hand and left-hand columns of stacked article storage cases 1 with the fork T of the forklift as shown in FIG. 9. In this case, the intermediate column of stacked article storage cases 1 which is not supported by the fork T of the forklift can also be transported by virtue of engagement between each engagement projection 4 and the counterpart engagement recess 5 which are movably fitted with each other. Specifically, as shown in FIG. 7, the neck portions 4b of the substantially T-shaped engagement projections 4 of each article storage case 1 forming the intermediate column of stacked article storage cases 1 is supported by the locking pieces 6a of the substantially C-shaped engagement recesses 5 of the associated article storage cases 1 forming the right-hand and left-hand columns of stacked article storage cases 1 to maintain the coupled condition. Therefore, the three columns of stacked article storage cases 1 can be lifted up without leaving the intermediate column of stacked article storage cases 1 and hence can be transported together.

Particularly in this case, a force is generated to urge the engagement projection 4 deeper into the engagement recess 5 because the neck portion 4b of the engagement projection 4 supported by the locking piece 6a of the engagement recess 5 is formed to have the V-shaped slopes 4c, so that the coupling between adjacent article storage cases 1 becomes firmer, which prevents the load from falling or collapsing during transportation or the like.

In separating the columns of stacked article storage cases 1 from each other one by one, one column is moved horizontally from the state shown in FIG. 8 so as to separate from the other column. At that time, each engagement projection 4 movably fitted in the counterpart engagement recess 5 can be smoothly withdrawn from the engagement recess 5, thereby releasing their coupling as shown in FIG. 5. In this way, the columns of stacked article storages cases 1 can be easily separated from each other one by one.

While one embodiment of the article storage case according to the present invention has been described above, the present invention is in no way limited to the embodiment described above. It is obvious that various variations and modifications are possible within the scope of the technical concept of the present invention defined by the claims.

For example, though the description of the foregoing embodiment has been directed to the article storage case 1 having a substantially rectangular parallelepiped form, the article storage case 1 may have a substantially cubic form or may have sidewalls which slant inwardly to define a narrower space as the sidewalls extend downwardly. Further, though the description of the foregoing embodiment has been directed to the article storage case 1 in which all of the four sidewalls 1a have their respective outside surfaces each formed with the engagement projection 4 and the engagement recess 5, it is possible that only two opposite sidewalls 1a are each formed with the engagement projection 4 and the engagement recess 5.

Figure 10:
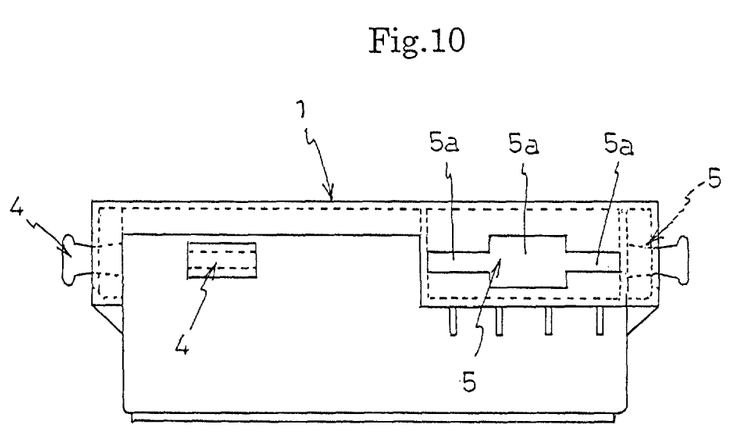
FIG. 10 is a front elevational view illustrating another embodiment of an article storage case according to the present invention.
Figure 11:
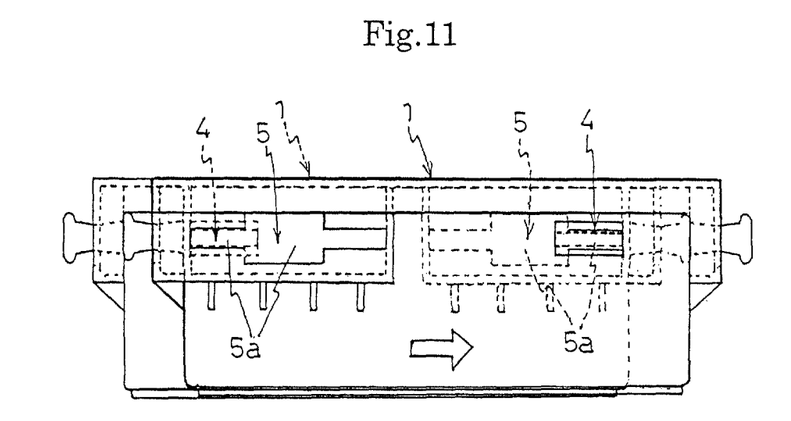
FIG. 11 is a front elevational view conceptually illustrating a state in which two article storage cases such as shown in FIG. 10 are placed side by side and slid relative to each other.

In the embodiment described above, the flange 3 which has the dangling piece 3a and is formed at the peripheral edge of the opening 2 for the purpose of reinforcement and the like is utilized as the upper portion of the engagement recess 5. However, an additional protruding piece forming part of the engagement recess may be formed so as to be opposed to the protruding piece 6 which forms the lower part of the engagement recess 5, thereby forming the engagement recess 5 at a desired place. Though the article storage case 1 according to the embodiment described above has the engagement recess 5 defining the opening 5a having a constant width, the opening 5a of the engagement recess 5 may have a narrower width on the right-hand and left-hand sides thereof as shown in FIG. 10. With such a feature, the engagement projection 4 movably fitted in the engagement recess 5 is rendered hard to come off by sliding one of adjacent cases as shown in FIG. 11 after the substantially T-shaped engagement projection 4 has been movably fitted into the engagement recess 5.

Though the case where the forklift F lifts up and transports the stacks of article storage cases 1 without using a pallet has been described in the foregoing embodiment, it is obviously possible to stack article storage cases 1 according to the present invention on a conventional pallet and transport the stack of article storage cases 1 together with the pallet by the forklift F. With a view to reliably preventing a load of article storage cases from falling or collapsing during transportation by the forklift F or the like, a stack of article storage cases 1 according to the present invention may be bound with a band or the like as in a conventional manner.

The article storage case according to the present invention can be applied not only to a case for storage of parts used in a factory or the like but also to a case for storage of beer bottles or for storage of vegetables and a like storage case regardless of the type of articles to be stored therein. The article storage case according to the present invention can be manufactured using different materials including plastic, wood and metal with no limitation on the materials. Further, the article storage case according to the present invention need not be wholly integrally molded, but may be formed by combining plural parts together. In such a case, the article storage case may comprise two parts, namely, a case body formed of a plastic corrugated fiberboard or the like, and a frame member having an engagement projection and an engagement recess which can be fitted on the peripheral edge of an opening in an upper portion of the case body.

INDUSTRIAL APPLICABILITY

With the article storage case according to the present invention, it is possible to couple such article storage cases to each other highly reliably by simply placing these cases side by side. Even when such article storage cases are stacked in tiers, a load of the article storage cases thus stacked is hard to fall or collapse and can be transported by a forklift without use of a pallet. For this reason, the article storage case is widely applicable to a case for storage of parts used in a factory or the like, for storage of beer bottles or for storage of vegetables, and a like article storage case.

The invention claimed is:

1. An article storage case comprising a substantially cubic or rectangular parallelepiped form having an opening oriented upwardly,
    wherein a sidewall of the article storage case has an outside surface formed with an engagement projection and an engagement recess, the engagement projection is configured to movably fit into the engagement recess of another one of the article storage case, the engagement recess is configured to receive the engagement projection of the another one of the article storage case, and when a plurality of the article storage cases are placed side by side, the engagement projections and the engagement recesses of adjacent storage cases engage each other,
    wherein the engagement projection includes a projecting ridge extending horizontally from the outside surface of the sidewall, the projecting ridge having a vertical cross-section that is substantially T-shaped, a base end of the T-shaped projecting ridge being attached to the sidewall, and a front end of the T-shaped projecting ridge including bulged tips that respectively extend upwardly and downwardly,
    wherein the engagement recess is an elongated recess extending horizontally on the outside surface of the sidewall, the engagement recess having a vertical cross-section that is substantially C-shaped, a closed side of the C-shaped engagement recess being combined with the sidewall, and an open side of the C-shaped engagement recess having a front opening that is narrower than a cross-sectional area inside the C-shaped engagement recess, and
    wherein an overall height and size of the front end of the T-shaped projecting ridge is smaller than a height and size of the front opening of the C-shaped engagement recess, and the front end of the T-shaped projecting ridge freely passing through the front opening of the C-shaped engagement and an inside the C-shaped, when the front end of the T-shaped projecting ridge and the front opening of the C-shaped engagement recess are horizontally aligned.

2. The article storage case according to claim 1, wherein the T-shaped engagement projection is arranged on one of a right-hand side and a left-hand side of the outside surface of the sidewall, while the C-shaped engagement recess is formed on the another one of the right-hand side and the left-hand side of the outside surface of the sidewall and on a same horizontal plane as the T-shaped engagement projection.

3. The article storage case according to claim 1, wherein all four sidewalls of each article storage case have respective outside surfaces each containing the T-shaped engagement projection and the C-shaped engagement recess.

4. The article storage case according to claim 3, wherein the T-shaped engagement projection is arranged on one of a right-hand side and a left-hand side of the outside surface of the sidewall, while the C-shaped engagement recess is formed on the another one of the right-hand side and the left-hand side of the outside surface of the sidewall and on a same horizontal plane as the T-shaped engagement projection.

5. The article storage case according to claim 2, wherein all four sidewalls of each article storage case have respective outside surfaces containing the T-shaped engagement projection and the C-shaped engagement recess.

6. The article storage case according to claim 1, wherein the T-shaped engagement projection has a neck extending between the base end and the front end of the T-shaped projecting ridge, the neck having a narrowed intermediate portion that pass a smaller width than portions of the neck adjacent the base end and the front end of the T-shaped projecting ridge.

7. The article storage case according to claim 6, wherein the neck of the T-shaped engagement projection has a vertical cross-section that is substantially V-shaped.

8. The article storage case according to claim 1, wherein the C-shaped engagement recess includes:
- an upper part including a flange extending horizontally outward from a top edge of the sidewall, the flange including a dangling piece and extends downward;
- a lower part including a protruding piece extending horizontally outward from the sidewall, the protruding piece including a locking piece that extends upward and toward the dangling piece of the flange.

* * * * *